(No Model.)

J. L. JOYCE.
EGG CARRIER.

No. 355,997. Patented Jan. 11, 1887.

Witnesses
J. N. Shumway
Fred C. Earle

Jos. L. Joyce
Inventor
By Atty

UNITED STATES PATENT OFFICE.

JOSEPH L. JOYCE, OF NEW HAVEN, CONNECTICUT.

EGG-CARRIER.

SPECIFICATION forming part of Letters Patent No. 355,997, dated January 11, 1887.

Application filed July 26, 1886. Serial No. 209,039. (No model.)

*To all whom it may concern:*

Be it known that I, JOSEPH L. JOYCE, of New Haven, in the county of New Haven and State of Connecticut, have invented a new Improvement in Egg-Carriers; and I do hereby declare the following, when taken in connection with accompanying drawings, and the letters of reference marked thereon, to be a full, clear, and exact description of the same, and which said drawings constitute part of this specification, and represent, in—

Figure 1:
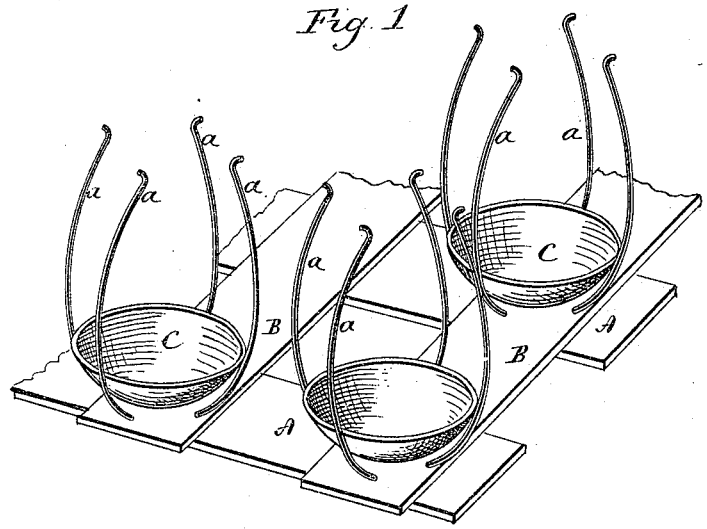
Figure 2:
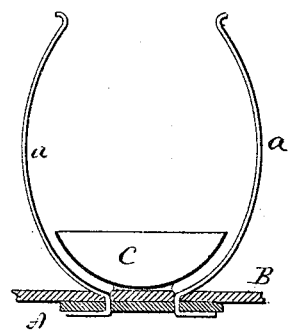
Figure 3:

Figure 1, a perspective view showing a portion of a plate; Fig. 2, a vertical central section through one of the series of springs, base, and cup; Fig. 3, a modification of the cup.

This invention relates to an improvement in that class of egg-carriers in which several series of wire springs are set into a base, each of the series of springs extending up, so as to embrace the egg set between them, and is an improvement upon the invention for which Letters Patent No. 314,942 were granted to me, dated March 31, 1885. In my said patent the egg necessarily rests upon the base, and the base being flat only a very small bearing is given for the end of the egg. In some cases a very considerable jar renders the eggs liable to crack or "chip" at the point where they rest upon the base.

The object of my invention is to overcome this difficulty; and it consists in a cup arranged between the springs on the base, presenting a concave side upward in which the egg may rest, and so as to take a very considerable extent of bearing.

In the illustration I show but a portion of a single plate with the springs arranged thereon, and the base such as described in my application for Letters Patent, Serial No. 203,743. The base is composed of a series of longitudinal strips, A, combined with a series of transverse strips, B, and the wire springs *a a* set through the strips at their crossing, as seen in Fig. 2, the lower end extending downward through the base or plate and bent back upon the plate, the upper portion bent outward over the plate, so as to take a bearing thereon, and curved upward to embrace the egg, each egg standing independent of the others.

On the base between the springs I fix a cup, C. This cup is best made from pasteboard or pulp, and so as to have a concavo-convex shape, and is glued or otherwise secured to the base the concave side up, as represented, and standing concentric between the springs. The lower end of the egg sets in the cup and is supported thereby, thus giving a very considerable extent of support, and because of being made from a semi-flexible material the support for the egg at the base is yielding, and all liability to break by a jar is avoided.

The cups may be molded from pulp, or struck up from a disk of pasteboard, or they may be made from a square blank, as seen in Fig. 3, the corners extending upward.

I claim—

1. An egg-carrier consisting of a plate having several sets of wire springs thereon, each set composed of several springs secured in and extending up from the base to embrace the eggs, combined with a cup fixed upon the base concentrically within the springs, substantially as described.

2. A base having several sets of wire springs thereon, each set composed of several springs, and each spring being a single wire, one end of each of said springs inserted through the base and bent down upon the reverse side, the projecting portion of the said single springs bent outward on the upper surface of the base and curved upward and inward, combined with a concave cup fixed upon the base concentrically within the springs, substantially as described.

JOS. L. JOYCE.

Witnesses:
FRED C. EARLE,
J. H. SHUMWAY.